United States Patent [19]

Balbinot

[11] Patent Number: 5,590,273
[45] Date of Patent: Dec. 31, 1996

[54] MICROCONTROLLER INTEGRATED CIRCUIT WITH READ ONLY MEMORY CONTAINING A GENERIC PROGRAM

[75] Inventor: Jean-Pierre Balbinot, Le Kremlin-Bicetre, France

[73] Assignee: Alcatel Mobile Communication France, Paris, France

[21] Appl. No.: 593,283

[22] Filed: Jan. 30, 1996

Related U.S. Application Data

[63] Continuation of Ser. No. 272,073, Jul. 8, 1994, abandoned.

[30] Foreign Application Priority Data

Jul. 13, 1993 [FR] France .................. 93 08626

[51] Int. Cl.⁶ .................................... G06F 11/00
[52] U.S. Cl. ...................................... 395/182.01
[58] Field of Search .................. 395/180, 181, 395/182.13, 182.18, 182.16, 182.21, 182.01, 600; 5/650

[56] References Cited

U.S. PATENT DOCUMENTS 4,435,763  3/1984  Bellay et al. ............ 364/200
4,490,783  12/1984  McDonough et al. ........ 364/200
4,641,308  2/1987  Sacarisen et al. ........... 371/16
4,797,808  1/1989  Bellay et al. .
5,157,781  10/1992  Harwood et al. .
5,202,978  4/1993  Nozuyama ................ 395/575

*Primary Examiner*—Robert W. Beausoliel, Jr.
*Assistant Examiner*—Norman M. Wright
*Attorney, Agent, or Firm*—Sughrue, Mion, Zinn, Macpeak & Seas

[57] ABSTRACT

A microcontroller integrated circuit comprises a processor core which exchanges data with at least one data processing and/or storage device. The integrated circuit comprises a mask-programmed read only memory containing a generic program such as a test program which can be executed by the microcontroller. The generic program includes a basic function for writing data into the data processing and/or storage device or devices. The write function is used to load a downloading program. Because a downloading program is not permanently stored in the read only memory, the microcontroller can be tested independently of the application program, and remains standard with regard to the type of memory component with which it can be used in a system.

20 Claims, 3 Drawing Sheets

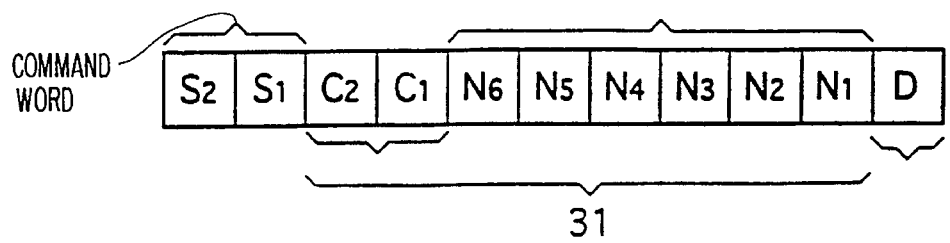
Fig. 3
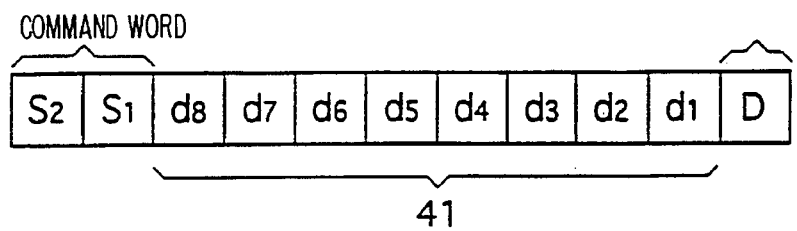
Fig. 4
TEST STATION TO MICROCONTROLLER
| 0 | 0 | 0 | 0 | 0 | 0 | 1 | 0 | 51 |
| 0 | 0 | 0 | 1 | 0 | 0 | 1 | 0 | 52 |
| 0 | 0 | 1 | 1 | 0 | 1 | 0 | 0 | 53 |
| 0 | 1 | 0 | 1 | 0 | 1 | 1 | 0 | 54 |
Fig. 5
MICROCONTROLLER TO TEST STATION
| 1 | 1 | 0 | 0 | 0 | 0 | 0 | 0 | 81 |
Fig. 8

TEST STATION TO MICROCONTROLLER

| 0 | 1 | 0 | 0 | 0 | 0 | 1 | 1 |

⌐ 61

MICROCONTROLLER TO TEST STATION

TEST STATION TO MICROCONTROLLER

| 1 | 0 | 0 | 0 | 0 | 1 | 0 | 0 | — 71

| 0 | 0 | 0 | 0 | 0 | 0 | 0 | 0 | — 72

| 0 | 0 | 0 | 0 | 0 | 0 | 0 | 0 | — 73

| 0 | 0 | 0 | 0 | 0 | 0 | 0 | 0 | — 74

| 0 | 0 | 0 | 0 | 0 | 0 | 0 | 0 | — 75

| 0 | 0 | 0 | 0 | 0 | 0 | 0 | 0 | — 76

Fig. 7

MICROCONTROLLER INTEGRATED CIRCUIT WITH READ ONLY MEMORY CONTAINING A GENERIC PROGRAM

This is a continuation of application Ser. No. 08/272,073 filed Jul. 8, 1994, now abandoned.

BACKGROUND OF THE INVENTION

1. Field of the Invention

The field of the invention is that of electronic integrated circuits.

2. Description of the Prior Art

To be more precise, the invention concerns a microcontroller integrated circuit. A microcontroller is usually a VLSI (Very Large Scale integration) integrated circuit containing all or most of the components of a "computer". Its function is not predefined but depends on the program that it executes, with the result that in respect of potential applications it is very much a general purpose device.

A microcontroller necessarily comprises a processor core including a command sequencer (which is a device distributing various control signals to the other components according to the instructions of a program), an arithmetic and logic unit (for processing the data) and registers (which are specialized memory units).

The other components of the "computer" can be either internal or external to the microcontroller, however. In other words, the other components are integrated into either the microcontroller or auxiliary circuits.

These other components of the "computer" are data processing and/or storage devices, for example read only or random access memory containing the program to be executed, clocks and interfaces (serial or parallel).

As a general rule, a system based on a microcontroller therefore comprises a microchip containing the microcontroller, and a plurality of microchips containing the external data processing and/or storage devices which are not integrated into the microcontroller. A microcontroller-based system of this kind comprises, for example, one or more printed circuit boards on which the microcontroller and the other components are mounted.

It is the application program, i.e. the program which is executed by the microcontroller, which determines the overall operation of the microcontroller system. Each application program is therefore specific to a separate application.

In most current applications the application program is too large to be held in the microcontroller and is therefore stored in a memory external to the microcontroller. This program memory, which has only to be read, not written, is generally a reprogrammable read only memory (REPROM).

After the application program has been programmed in memory and then started in order to be executed by the microcontroller, the microcontroller system may not function as expected.

In the least unfavorable situation this is a minor dysfunction of the system and the microcontroller is still able to dialog with a test station via a serial or parallel interface. This test station is then able to determine the nature of the problem and indicate precisely the type of correction (software and/or physical) to be applied to the system for it to operate correctly.

Unfortunately, most dysfunctions of a microcontroller-based system result in a total system lock-up, preventing any dialog with a test station. It is then impossible to determine the type of fault, i.e. whether it is a physical fault (in the microcontroller itself, in an external read only memory, in a peripheral device, on a bus, etc) or a software fault (i.e. an error in the application program). The troubleshooting technique usually employed in these cases of total lock-up is based on the use of sophisticated test devices requiring the application of probes to the pins of the various integrated circuits of the microcontroller-based system under test.

There are various problems associated with the use of such test devices for troubleshooting a microcontroller-based system. The probes used in these test devices are very fragile, difficult to apply because of the small size of the circuit and their close packing, and may not make good contact with the circuit.

Also, because of their high cost, these test devices are not mass produced. Consequently, faulty microcontroller-based systems cannot be repaired immediately, wherever they happen to be located at the time, but must first be returned to a place where a test device is available.

Troubleshooting a microcontroller-based system in this way is time-consuming, irksome and costly.

To avoid the need for direct action on the microcontroller-based system each time the application program executed by the microcontroller of the system is changed, it is standard practise to use a downloadable read only memory to store the application program, a loading program being written into a mask-programmed read only memory of the microcontroller. The mask-programmed read only memory of the microcontroller is integrated into the microcontroller and programmed once and for all during manufacture of the microcontroller.

To change the application program the microcontroller is reset by running the downloading program. This downloading program can then communicate with a workstation connected to the microcontroller by an appropriate transmission line, this workstation containing the new application program to be written into the microcontroller. The downloading program receives the new application program and loads it into a read only memory external to the microcontroller.

Although this solution avoids the need for direct action on the microcontroller-based system (which would entail removing from the system the reprogrammable read only memories containing the application program, writing into these memories the new application program using an appropriate programming device and then replacing them in the system), it nevertheless has a major drawback, namely specialization of the microcontroller during manufacture.

Each type of reprogrammable memory is associated with a different downloading program because the programming parameters (voltage to be applied, duration for which the voltage is to be applied, etc) vary with the technology employed. The downloading program is written once and for all into the mask-programmed internal memory of the microcontroller and the latter is therefore restricted to using memory components of the type for which this downloading program was written. In other words, the microcontroller is not a standard component and this increases its cost of manufacture.

One object of the invention is to overcome these various drawbacks of the prior art.

To be more precise, an object of the invention is to provide a microcontroller circuit which can verify quickly, simply, reliably and at low cost the operation of a system based on the microcontroller.

Another object of the invention is to provide a microcontroller integrated circuit which can accurately locate the defective component or components of a system using the microcontroller in the event of dysfunction of the system.

A further object of the invention is to provide a microcontroller integrated circuit which avoids the need for direct action on the microcontroller-based system to change the application program, whilst remaining standard as regards the type of memory component with which it can be used in a system.

SUMMARY OF THE INVENTION

These objects, and others that emerge below, are achieved in accordance with the invention by means of a microcontroller integrated circuit comprising a processor core adapted to exchange data with at least one data processing and/or storage device, said integrated circuit comprising a read only memory containing a generic program such as a test program which can be executed by said microcontroller, said generic program including a basic function for writing data into said data processing and/or storage device or devices and said write function being used to load a downloading program.

The storage and/or data processing devices are either integrated into the microcontroller (i.e. into the microcontroller integrated circuit comprising the processor core) or external to the microcontroller and integrated into separate circuits.

In a preferred embodiment of the invention said read only memory containing the generic program is a mask programmed read only memory, said mask-programmed read only memory being programmed once and for all during manufacture of said integrated circuit.

Thus, unlike prior art microcontrollers in which the mask-programmed read only memory, if any, contains either an application program (if this is small) or a downloading program (restricted to a specific type of memory component), the microcontroller of the invention has a mask-programmed memory containing a generic program such as a test program.

Accordingly, the microcontroller can be tested with its environment, independently of the application program. This test can be run either before the application program is started or after the application is started if the system in which the microcontroller is used fails or is subject to a dysfunction.

In a preferred embodiment of the invention said generic program such as a test program comprises a selection of the following basic functions:

reading of data stored by said data processing and/or storage device or devices;

writing of data in said data processing and/or storage device or devices;

executing a program written in said data processing and/or storage device or devices.

The generic program such as a test program can therefore be very small in size and thus readily integrated into the microcontroller.

These three basic functions provide for complete testing of the microcontroller alone or with its environment.

Said data processing and/or storage device or devices are advantageously selected from the group including:

reprogrammable read only memories, programmable more than once after fabrication of said integrated circuit;

random access memories;

clocks;

peripheral devices.

The read function is used to verify the content of the read only memory storing (or for storing) the application program, to test the information acquired by the various peripheral devices and, in combination with the write function, to test the validity of the random access memory.

The write function, which advantageously does not use any random access memory, is used to validate the various peripheral devices and the random access memory. It can load any program into the random access memory, including a more powerful self-test program (after verifying that the microcontroller and its environment are capable of executing the basic functions correctly), or any program for downloading the read only memory enabling dynamic adaptation of the microcontroller-based system by modification of its application program. The fact that any downloading program can be written into random access memory is very important because this means that the microcontroller of the invention is not restricted to a specific type of memory component: the microcontroller of the invention is a standard and therefore low cost product.

The execute function is used to execute a program written in random access memory by the write function.

The set of three functions can be used to carry out all kinds of tests and even for troubleshooting during production.

The integrated circuit of the invention advantageously comprises communication means implementing a protocol for dialog between a generic test program and a test station connected to said integrated circuit.

The microcontroller-based system can therefore be remotely tested from the test station, the generic test program supplying to the test station, on request, full information concerning the microcontroller and its environment.

The group of basic functions constituting said generic test program preferably includes measurement of the speed at which data is transmitted from said test station so that said communication means can match the speed at which data is transmitted from said integrated circuit to said speed at which data is transmitted by said test station. This simplifies the test station because it always transmits data at the same speed, regardless of the speed at which the microcontroller to which it is connected operates.

Said communication means are advantageously equivalent to a universal asynchronous receiver/transmitter (UART; conventionally incorporated in a microcontroller) of which only the receive and transmit signals are used.

Said communication means preferably comprise a serial interface and said generic test program receives from said test station messages for activating either one of said basic functions or a pointer positioning function and sends to said test station messages as to the result of activating one of said elementary functions. The serial interface is an RS232 interface, for example.

Said activation messages are advantageously selected from the group comprising:

messages specifying a predetermined address for a current pointer, each message comprising an address specification command word in which the number of specification bytes is encoded and at least one data word containing said specification bytes;

messages to read a memory from the current pointer address, each message comprising a read command word in which a number of bytes to read is encoded;

messages to write in a memory from the current pointer address, each message comprising a write command word in which a number of bytes to write is encoded and at least one data word containing said bytes to write;

messages to execute a program stored in a memory from the current pointer address, each message comprising an execute command word.

Each of said result messages advantageously comprise at least one data word containing read data. In other words, the activation messages comprise a command word, possibly followed by one or more data words, and the result messages comprise one or more data words.

Each command word and each data word advantageously comprise at least one start bit, at least one data bit and at least one stop bit. This secures transmission of data between the generic test program of the microcontroller and the test station.

Each of said command words preferably comprises eight data bits, as follows:

two bits encoding the command word type; and six bits encoding a number of specification bytes, bytes to read and bytes to write, according to whether the command word coded in the other two bits is respectively a specification command word, a read command word or a write command word.

In an advantageous embodiment of the invention said integrated circuit comprises a pin for starting said generic program such as a test program, said generic program such as a test program being started when said start pin is excited after said integrated circuit has been reset. The start pin is used to tell the microcontroller that it must switch to test mode, i.e. start execution of the generic test program.

The invention also concerns a method of manufacturing a microcontroller integrated circuit comprising a step of etching a mask-programmed read only memory containing said generic program such as a test program.

The invention also concerns an integrated circuit test station for testing an integrated circuit of the invention, said station comprising means for transmitting activation messages and receiving result messages. Other features and advantages of the invention will emerge from a reading of the following description of a preferred embodiment of the invention given by way of non-limiting example only and from the appended drawings.

BRIEF DESCRIPTION OF THE DRAWINGS

FIG. 3 shows one embodiment of the structure of a command word exchanged between the test station and the microcontroller of the invention as shown in FIG. 1.

FIG. 4 shows one embodiment of the structure of a data word exchanged between the test station and the microcontroller of the invention as shown in FIG. 1.

FIGS. 5 to 8 each show one example of dialog between the microcontroller of the invention and the test station as shown in FIG. 1, in the following respective cases:

* positioning a pointer;
* reading a memory;
* writing a memory;
* executing a program.

DETAILED DESCRIPTION OF THE PREFERRED EMBODIMENT

In this description said generic program is a generic test program, for example, and said read only memory containing this generic program is a mask-programmed memory programmed once and for all during manufacture of said integrated circuit.

The invention thus concerns a microcontroller integrated circuit (referred to simply as a microcontroller in the remainder of the description).

Figure 1:
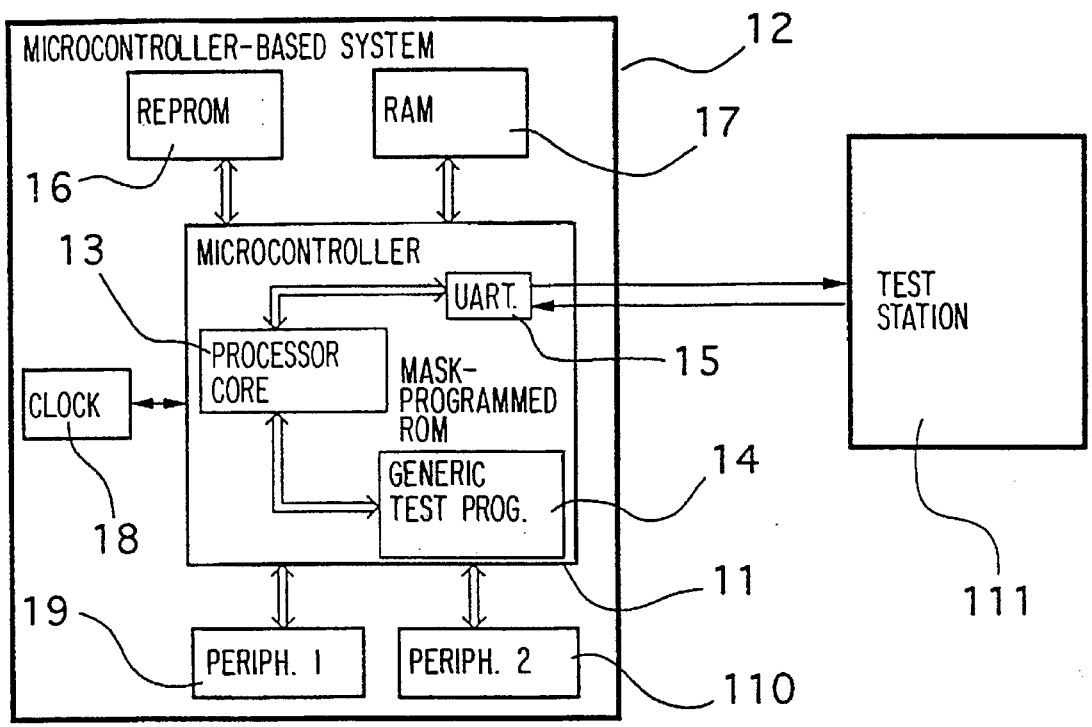
FIG. 1 shows a simplified block diagram of a system based on one embodiment of a microcontroller of the invention, this microcontroller-based system being connected to a test station.

FIG. 1 shows one specific embodiment of a microcontroller 11 of the invention and a system 12 based on the microcontroller 11.

In the specific embodiment the microcontroller 11 comprises a minimum of components namely:

a processor core 13;

a mask-programmed read only memory 14, programmed once and for all during manufacture of the microcontroller, and a UART (universal asynchronous receiver/transmitter) 15.

The other data processing and/or storage devices enabling the microcontroller 11 to operate are external to the microcontroller 11 in this example, and with the latter constitute the microcontroller-based system 12. In this specific embodiment the data processing and/or storage devices are:

a reprogrammable read only memory (REPROM) 16 which can be programmed more than once after manufacture of the microcontroller 11 and is for storing the application program executed by the microcontroller 11 and defining the function of the latter and more generally the function of the system 12 as a whole;

a random access memory (RAM) used during execution of a program by the microcontroller 11;

a clock 18;

two peripheral devices 19, 110.

Clearly the microcontroller of the invention is not restricted to this particular embodiment. Thus, in other embodiments, all or some of the data processing and/or storage devices 16 through 110 can be integrated into the microcontroller.

Likewise, other types of data processing and/or storage devices (either internal or external to the microcontroller 11) can be used.

The mask-programmed read only memory of the microcontroller 11 contains a generic test program.

Figure 2:
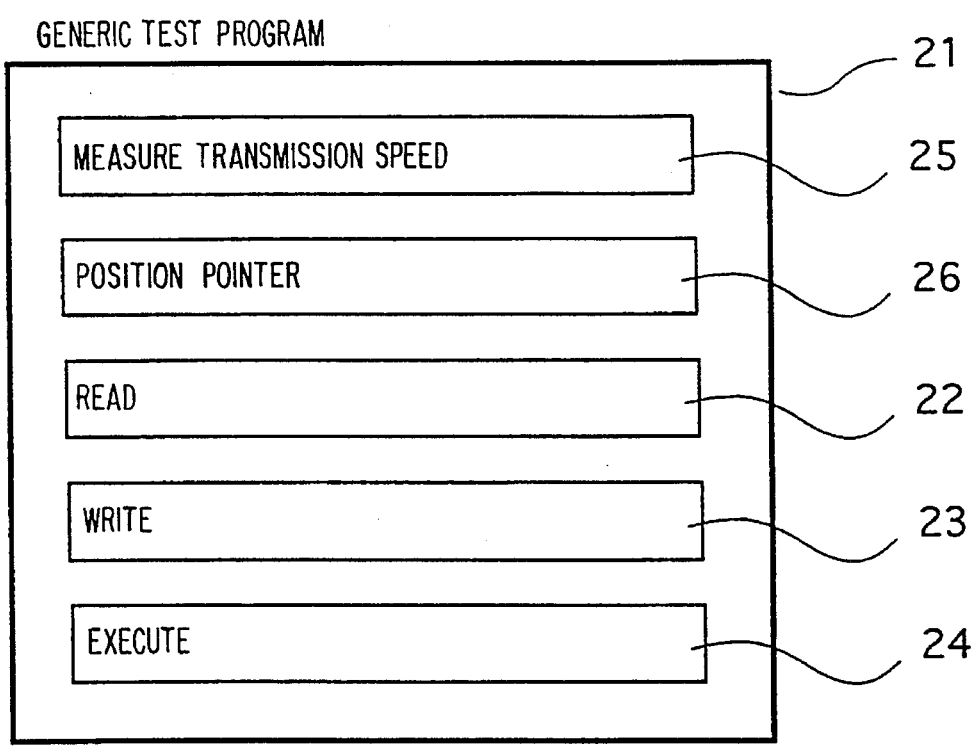
FIG. 2 shows a simplified block diagram of one embodiment of a generic test program as contained in the mask-programmed read only memory of a microcontroller of the invention.

In a preferred embodiment, a simplified block diagram of which is shown in FIG. 2, the generic test program 21 comprises a plurality of basic functions including:

22: reading of data stored in some data processing and/or storage devices, such as the reprogrammable read only memory 16, the random access memory 17 or the peripheral devices 19, 110;

23: writing of data in some data processing and/or storage devices such as the random access memory 17 or the peripheral devices 19, 110;

24: execution of the program written into one of the data processing and/or storage devices such as the random access memory 17.

In this embodiment the generic test program 21 also comprises two other basic functions, namely measurement of a transmission speed (25) and positioning of a pointer (26). These functions are described in detail below.

The generic test program 21 is used to verify and validate either the microcontroller 11 alone or the microcontroller 11 and its environment (i.e. the microcontroller-based system 12).

The generic test program 21 is used to test and validate each of the components constituting the microcontroller-based system.

The correct operation of the microcontroller alone can be verified in a first phase, i.e. before it is introduced into the system 12 in order to cooperate with the data processing and/or storage devices 16 through 110. The correct operation of the system 12 as seen by the microcontroller can be verified in a second phase.

These two preliminary test and validation phases do not require the presence of an application program in memory (read only memory 16 or random access memory 17). All that is required is to tell the microcontroller 11 that it must switch to test mode, in which mode it executes the generic test program (as contrasted with the normal operating mode in which it executes the application program contained in memory). In one specific embodiment of the invention the microcontroller 11 comprises a start pin (not shown) and the generic test program is started when this start pin is excited after the microcontroller has been reset.

Note that the microcontroller 11 and its environment (external devices 16 through 110) can also be tested and validated in the event of a dysfunction of the system 12 during execution of the application program.

Finally, the write basic function 23 can write into random access memory a test (or self-test) program that is more complex than the generic test program 21 but whose correct execution presupposes that the microcontroller 11 and its environment are operational in respect of execution of the basic functions 22 through 24.

The application program, i.e. the program executed by the microcontroller 11 and which confers its function on it, is usually written into a memory after the microcontroller 11 and its environment have been tested and validated.

The generic test program 21 of the microcontroller of the invention offers various ways to store the application program in memory.

A first way is to store the application program directly in random access memory 17 using the write basic function 23.

A second way, offering better performance because it is durable, consists in storing the application program indirectly in read only memory 16 and storing beforehand in random access memory 17 a program for downloading this read only memory 16. Clearly any type of downloading program (and thus any type of reprogrammable memory) can be used because the generic test program writes it into the random access memory 17 like any other program (in other words, the content of the program written is transparent insofar as the write function 23 of the generic test program 21 is concerned). The microcontroller 11 of the invention can therefore adapt dynamically to its application context (through the facility for downloading of the read only memory) whilst remaining a standard product (in that there is no limitation as to any specific type of reprogrammable memory).

Referring to FIG. 1, the microcontroller 11 is usually connected to a test station 111, by an RS232 serial link, for example. To this end the microcontroller and the test station each comprise communication means for implementing a dialog protocol. The test station 111 is a microcomputer, for example.

In the specific embodiment of the invention shown in FIGS. 1 and 2 the generic test program 21 comprises a basic function 25 for measuring the transmission speed from the test station 111. The transmission speed of the communication means 15 of the microcontroller 11 is then made equal to that of the test station 111, and is therefore independent of the clock 18 of the system 12. The communication means 15 are equivalent to a UART (Universal Asynchronous Receiver/Transmitter), for example, of which only the receive signal Rx and transmit signal Tx are used.

One example of a protocol for exchange of data between the microcontroller 11 and the test station 111 is now described with reference to FIGS. 3 through 8.

The test station 111 sends to the microcontroller 11 messages to activate one of the following four basic functions: read 22, write 23, execute 24 and position a pointer 26 of the generic test program 21.

In return, the generic test program 21 sends the test station 111 messages as to the result of activating one of said basic functions.

An activation message comprises a command word, possibly followed by one or more data words. A result message comprises one or more data words.

FIG. 3 shows one embodiment of the structure of a command word. In this example a command word comprises a start bit D, a data byte 31 comprising six bits N1 through N6 encoding the command word type and two stop bits S1, S2.

The codes for the command word type are as follows:

00: position pointer command 26;

01: read command 22;

10: write command 23;

11: execute command 24.

FIG. 4 shows one embodiment of the structure of a data word. In this example a data word comprises a start bit D, a data byte 41 and two stop bits S1, S2.

The number coded in binary in bits N1 through N6 is one less than the number of bytes to be coded (N) (i.e. N–1).

The number N to be coded is:

a number of bytes in which is specified the address at which a current pointer must be positioned in the case of a pointer positioning command word;

a number of bytes to be read from the current pointer address in the case of a read command word;

a number of bytes to be written from the current pointer address in the case of a write command word.

Each of FIGS. 5 through 8 shows one example of dialog between the microcontroller of the invention and the test station. To simplify the diagrams only the data bytes are shown (the start bits D and the stop bits S1, S2 do not convey any data).

FIG. 5 shows the situation of specification by the test station of an address to which the current pointer of the microcontroller is to be positioned, the address specified being the memory address from which one of the three basic functions (read, write, execute) is to be executed.

In this example the address specified is 123456 and each digit specifying the address is coded on four bits.

Accordingly the test station first sends a command word S1 indicating that this is a pointer positioning command (C2C1=00) and that the address is coded on N=3 bytes (N6 to N1=(10) binary=2=N–1), followed by three data words 52 through 54 containing the address (0001, 0010, 0011, 0100, 0101 and 0110 respectively corresponding to the coding of 1,2,3,4,5 and 6).

FIG. 6 shows the situation in which the test station commands reading of bytes by the microcontroller from the current pointer address.

In this example the station sends a command word 61 indicating a read (C2C1=01) and that there are N=4 (N6 to N1=(11) binary=3=N−1) bytes to read. The microcontroller then sends the test station the four data words 62 through 65 containing the data read (bits denoted x to indicate any value).

FIG. 7 shows the situation of the test station commanding writing of bytes by the microcontroller from the current pointer address.

In this example the test station first sends a command word 71 indicating a write (C2C1=10) and that there are N=5 (N6 to N1=(100) binary=4=N−1) bytes to write, followed by five data words 72 through 76 containing the data to be written (0 for all the bits in this example).

FIG. 8 shows the situation of the test station commanding execution by the microcontroller of a program stored from the current pointer address. Accordingly, the test station sends a command word 81 indicating execution (C2C1=11).

The invention also concerns a method of manufacturing a microcontroller integrated circuit as described above by means of one specific embodiment. This method comprises a step of etching the mask-programmed read only memory containing the generic test program.

There is claimed:

1. A microcontroller integrated circuit, comprising:

a processor core, adapted to exchange data with at least one data processing or storage device, and a read only memory containing a generic program which can be executed by said microcontroller, said generic program including a basic function for writing data into said data processing or storage device, said data processing or storage device containing a downloading program stored under control of said generic program.

2. The integrated circuit according to claim 1 wherein said generic program further comprises a basic function for reading data stored by said data processing or storage device.

3. The integrated circuit according to claim 1 wherein said generic program further comprises a basic function for executing a program written in said data processing or storage device.

4. The integrated circuit according to claim 1 wherein said data processing or storage device is selected from the group consisting of:

reprogrammable read only memories which can be programmed more than once after manufacture of said integrated circuit;

random access memories;

clocks; and peripheral devices.

5. Integrated circuit according to claim 1 further comprising communication means implementing a protocol for dialog between a generic test program and a test station connected to said integrated circuit.

6. Integrated circuit according to claim 5 wherein said generic test program also comprises measurement of the speed at which said test station transmits data so that said communication means can match the speed of transmission of data from said integrated circuit to said speed at which data is transmitted by said test station.

7. Integrated circuit according to claim 5 wherein said communication means are equivalent to an asynchronous receiver/transmitter of which only the receive and transmit signals are used.

8. Integrated circuit according to claim 5 wherein said communication means comprise a serial interface and said generic test program receives from said test station messages for activating either one of said basic functions or a pointer positioning function and sends to said test station messages as to the results of activating one of said basic functions.

9. Integrated circuit according to claim 8 wherein said activation messages are selected from the group comprising:

messages specifying a predetermined address for a current pointer, each message comprising an address specification command word in which is encoded the number of specification bytes and at least one data word containing said specification bytes;

messages to read a memory from the current pointer address, each message comprising a read command word in which a number of bytes to read is encoded;

messages to write a memory from the current pointer address, each message comprising a write command word in which is encoded a number of bytes to write and at least one data word containing said bytes to write;

messages to execute a program stored in a memory from the current pointer address, each message comprising an execute command word.

10. Integrated circuit according to claim 8 wherein each of said result messages comprises at least one data word containing read data.

11. Integrated circuit according to claim 9 wherein each command word and each data word comprises at least one start bit, at least one data bit and at least one stop bit.

12. Integrated circuit according to claim 11 wherein each command word comprises eight data bits as follows:

two bits encoding the command word type; and six bits coding a number of specification bytes, a number of bytes to read and a number of bytes to write according to whether the command word coded in the other two bits is respectively a specification command word, a read command word or a write command word.

13. Integrated circuit according to claim 1 further comprising a pin for starting said generic test program, said generic test program being started when said start pin is excited after said integrated circuit has been reset.

14. Integrated circuit according to claim 1 wherein said read only memory containing the generic program is a mask-programmed read only memory programmed once and for all during manufacture of said integrated circuit.

15. The integrated circuit according to claim 14 wherein said mask-programmed read only memory is an etched read only memory device.

16. Integrated circuit test station for testing an integrated circuit according to claim 1 further comprising means for transmitting activation messages and means for receiving result messages.

17. A microcontroller-based system comprising:

a microcontroller having a processor core and a read only memory; and a storage device;

said processor core being adapted to exchange data with said storage device;

said read only memory containing a generic program which is executable by said processor core;

said generic program including a writing function for writing a downloading program into said storage device;

said downloading program including a function for downloading an application program into said microcontroller-based system;

said storage device containing said downloading program stored under control of said generic program; and said microcontroller-based system containing said application program stored under control of said downloading program.

18. The microcontroller-based system as set forth in claim 17, wherein:

said application program is stored in a respective storage device, said respective storage device being physically distinct from said storage device containing said downloading program.

19. The microcontroller-based system as set forth in claim 18, wherein said storage device containing said downloading program and said respective storage device containing said application program are each selected from the group consisting of:

reprogrammable read only memories which can be programmed more than once after manufacture of said integrated circuit;

random access memories;

clocks; and peripheral devices.

20. A method for storing an application program in a microcontroller-based system, said method comprising the steps of:

storing a generic program in a read only memory of a microcontroller, said generic program having a write function for storing a downloading program into a storage device;

then executing said generic program to store said downloading program into said storage device, said downloading program having a function for downloading said application program; and then executing said downloading program to download said application program in said microcontroller-based system.

* * * * *